(12) United States Patent
Krumm et al.

(10) Patent No.: US 7,214,252 B1
(45) Date of Patent: May 8, 2007

(54) METHOD AND DEVICE FOR PYROLYZING AND GASIFYING ORGANIC SUBSTANCES OR SUBSTANCE MIXTURES

(75) Inventors: Wolfgang Krumm, Wenden (DE); Günter Funk, Siegen (DE); Stefan Hamel, Wenden (DE)

(73) Assignee: Herhof Umwelttechnik GmbH, Solms-Niederbiel (DE)

( * ) Notice: Subject to any disclaimer, the term of this patent is extended or adjusted under 35 U.S.C. 154(b) by 458 days.

(21) Appl. No.: 10/019,637

(22) PCT Filed: Jun. 27, 2000

(86) PCT No.: PCT/EP00/05953

§ 371 (c)(1),
(2), (4) Date: Jul. 8, 2002

(87) PCT Pub. No.: WO01/02513

PCT Pub. Date: Jan. 11, 2001

(30) Foreign Application Priority Data

Jun. 30, 1999 (DE) ............................ 199 30 071

(51) Int. Cl.
*C01B 3/32* (2006.01)
(52) U.S. Cl. .............. 48/198.2; 48/197 R; 48/198.6; 48/198.8; 48/197 FM; 48/209; 48/210; 48/211; 48/71; 422/139; 422/184; 422/144; 422/145; 422/146; 422/147; 422/211; 422/232

(58) Field of Classification Search ............... 48/61, 48/62, 71–73, 77, 78, 98–101, 108, 116, 197, 48/209; 422/139, 184, 144–147, 211, 232
See application file for complete search history.

(56) References Cited

U.S. PATENT DOCUMENTS

| 4,047,883 | A | 9/1977 | Waters ..................... 432/14 |
| 4,244,779 | A | 1/1981 | Nieminen et al. ........ 162/30 R |
| 4,568,362 | A | 2/1986 | Deglise et al. ............. 48/209 |

FOREIGN PATENT DOCUMENTS

| DE | 19720331 | 11/1998 |
| DE | 19755693 | 7/1999 |
| WO | 99/31197 | 6/1999 |

*Primary Examiner*—Glenn Caldarola
*Assistant Examiner*—Vinit H. Patel
(74) *Attorney, Agent, or Firm*—Dilworth & Barrese LLP

(57) ABSTRACT

An apparatus for pyrolysis and gasification of organic substances and mixtures thereof is provided with a pyrolysis reactor (1), a fluidized-bed firing (3) for pyrolysis residue, a reaction zone (2) for the pyrolysis gases (13) and circulating fluidized-bed material (35). The pyrolysis reactor (1) has a sluice for introducing application material (10) thereinto. An inlet for the fluidized-bed material (35) is disposed next to the combustion fluidized bed (3). Transport apparatus (14) for mixture of solid pyrolysis residue and circulating fluidized bed material (35) is disposed at or near a bottom of the fluidized bed (3) and lower end of the pyrolysis reactor (1). An overflow is situated at or near the top of the fluidized bed (3) while a heat transfer member is positioned within the reaction zone (2).

20 Claims, 3 Drawing Sheets

ABSTRACT # METHOD AND DEVICE FOR PYROLYZING AND GASIFYING ORGANIC SUBSTANCES OR SUBSTANCE MIXTURES

BACKGROUND OF THE INVENTION

The invention relates to a method for the pyrolysis and gasification of organic substances or mixtures of organic substances and to an apparatus for carrying out such a method.

A series of methods are known for the treatment and utilisation of organic substances and mixtures of organic substances by, for example, gasification and pyrolysis. The methods differ according to the oxidation or reduction gas used and according to the type of contact between the solid and the gas. In solid bearing or gas bearing a distinction is made between, among others, a circulating fluidised-bed gasifier, an entrained-bed gasifier, a rotary furnace gasifier and a moving-bed gasifier with counterflow gas bearing, co-current gas bearing or cross-flow gas bearing. The majority of known gasification methods is not suitable for smaller, decentralised systems due to the high apparatus effort. Smaller, decentralised systems are advisable in particular when biomass is used as the application material.

The operating behaviour of gasification methods in accordance with the principle of the circulating fluidised bed is highly dependent on the respective particle size household of the fluidised bed consisting of the application material to be gasified and the also circulating inert material. Corresponding demands result from this on the unit size of the application material. Extremely higher demands on the preparation of the fuel result in the case of entrained-bed gasification which only allows the use of pulverised fuel particles.

Further substantial disadvantages of the known gasification methods are that the proceeding process stages of drying, degassing, gasification and incineration of the application material proceed in zones which are directly next to one another and which merge into one another. As a result, the individual zones within a reactor are undefined and the degassing, gasification and incineration can proceed incompletely at points. In further known methods, an attempt is made to eliminate these disadvantages by the separation of the individual process stages proceeding at the fuel of degassing, gasification and incineration.

In DE 197 20 331 A1, a method and an apparatus for the gasification or incineration of dry or damp, fine-particle or fragmentary biomass and of waste are proposed in which due to the hot walls of an incinerator and due to the inflow of hot waste gas from the incinerator into a degassing furnace, biological raw materials degas in this, whereby coke and pyrolysis gas are produced, with the coke arriving at the glow bed of the gasification reactor after passing the shredder, whereas the pyrolysis gas burns in the incineration chamber of the gasification reactor under the supply of a limited amount of air and the waste gas produced subsequently flows through the glow bed of the gasification reactor in which an oxidation of the carbon to CO takes place with a simultaneous reduction of waste gas ($CO_2$) and steam ($H_2O$) to a combustible lean gas (CO, $H_2$). Due to the fact that the pyrolysis is carried out due to the heating because of the contact with hot combustion waste gases and that furthermore a partial incineration of the pyrolysis gas is carried out, only a product gas with a low calorific value can be produced with the method proposed in DE 197 20 331 A1. When fuels with a high content of volatile components and a low pyrolysis coke yield are used, there is a risk of an insufficient formation of the glow bed of the gasification reactor consisting of pyrolysis coke, whereby the oxidation of the carbon to CO with a simultaneous reduction of waste gas and steam to a combustible lean gas proceeds insufficiently at the cost of the product gas calorific value.

A method is furthermore known from U.S. Pat. No. 4,568,362 for the gasification of organic substances and mixtures of organic substances in which the organic substances are led into a pyrolysis reactor in which the organic substances come into contact with a heat transfer medium, whereby a rapid pyrolysis takes place which transforms the organic substances into pyrolysis products which consist of pyrolysis gases with condensable substances and a solid carbonaceous residue and the required heating energy for the pyrolysis is produced by incinerating the solid carbonaceous residue in a combustion reactor and in a second reaction zone of the pyrolysis reactor, the pyrolysis gases containing tar are subjected to such crack reactions and reactions with steam that a product gas with a high calorific value is obtained. In these methods, both the pyrolysis and the incineration of the solid carbonaceous residue take place in a fluidised bed. A reaction zone for the pyrolysis gases containing tar is provided in the upper part of the pyrolysis fluidised bed. The operation of the fluidised beds requires a high effort and a control of the reactions of the pyrolysis gases in the reaction zone is hardly possible.

The German patent application 197 77 693.0 of older priority and not pre-published, on which the German patent DE 197 55 693 C1 has been granted, discloses a method for the gasification of organic substances and mixtures of organic substances.

It is the underlying object of the invention to provide a method which is simple to carry out for the pyrolysis and gasification of organic substances or mixtures of organic substances and an apparatus to generate a gas with a high calorific value.

SUMMARY OF THE INVENTION

These objects are solved by the features set forth herein. Advantageous embodiments and further developments of the invention result with the use of the features set forth herein.

In a method for the pyrolysis and gasification of organic substances or mixtures of organic substances, this object is solved in accordance with the invention in that the pyrolysis is carried out in a moving-bed reactor or a rotary reactor, that a gasification agent, for example steam and/or oxygen, is optionally added to the pyrolysis gases and that they are led into a reaction zone in which the pyrolysis gases react with the gasification agent. The solid carbonaceous residue and, optionally, a portion of the pyrolysis gas are led to a fluidized-bed combustion reactor on their own or together with the fluidized-bed material and incinerated there. The fluidized-bed material is heated up there. The combustion waste gases and the fluidized-bed material are brought into contact with the reaction zone such that their thermal content can be used for the reaction of the pyrolysis gases with the solidifying agent. Fluidized-bed material taken from the fluidized-bed combustion reactor and consisting of ash, unburned coke and, optionally, additionally supplied refractory fluidized bed material, is returned to the pyrolysis reactor as a heat transfer medium, with the heat transfer to the application material for the carrying out of the pyrolysis taking place by contact with the fluidized-bed material and, optionally, additionally through the hot wall of the fluidized-bed combustion reactor.

The hot fluidised-bed material supplied to the pyrolysis reactor from the combustion fluidised bed effects a fast drying and pyrolysis of the application material by contact. A shaft furnace is suitable as the reactor, with the mixture of the application material and the fluidised-bed material migrating from the top to the bottom through the shaft furnace. In order to ensure the solid transport through the shaft furnace, fixed equipment, conveyor spirals or agitators can be provided in accordance with the prior art. The pyrolysis reactor can, for example, also be designed as a rotary reactor, whereby a good mixing of the application material and the hot fluidised-bed material is achieved and, at the same time, the solid transport is achieved. The steam which escaped from the application material during drying and the pyrolysis gases leave the pyrolysis reactor and enter into a further reaction zone. The mixture of the remaining solid carbonaceous pyrolysis residue and the fluidised-bed material is conveyed together into the combustion fluidised-bed, with conventional components such as screw conveyors or star wheels with inclined tube carrying-in being able to be used. A screw is preferred in the apparatus of the invention.

Due to the fact that the pyrolysis is preferably carried out in a shaft oven, the supply of a fluidizing medium required for a pyrolysis fluidized-bed can be omitted. In this way, the possibility exists to carry out the pyrolysis completely without supplying gas or, unlike a pyrolysis fluidized-bed to which a minimum amount of gas must be supplied for fluidizing, to add any desired low amounts, for example of the product gas or of a gasification agent such as steam, oxygen or air. In this way, the possibility exists to add gas or a gasification agent to the pyrolysis reactor as a technical method adaptation to the respective application material. In the method of the invention, the pyrolysis is preferably carried out in the pyrolysis reactor in the absence of air and of gas. Another advantage of the carrying out of the pyrolysis in a separate process stage consists of the crushing effect which occurs during pyrolysis, allowing the use of coarser fragmentary material than normally used in fluidized-bed reactors due to the smouldering and degassing. Alternatively, the possibility exists of interposing a crushing apparatus such as a roller crusher before the carrying-in apparatus for the solid carbonaceous pyrolysis residue and the fluidized-bed material into the combustion fluidized-bed, whereby the demands on the application material particle sizes can be further reduced. The energy to be used for the crushing of pyrolysis coke is here substantially lower than that for the crushing of, for example, biomass such as wood.

The carbonaceous solid pyrolysis residue is incinerated with air in the fluidised bed, itself thereby becomes fluidised-bed material as ash and, due to the energy release, further heats up or again heats up fluidised-bed material already present. The combustion fluidised bed can be designed and operated according to the level of knowledge of fluidised bed technology. A stepped addition of air can be advantageous with respect to the emissions of the combustion fluidised bed. The combustion reactor is designed as a stationary fluidised bed, that is the gas amount of the fluidised medium must be sufficient, on the one hand, to exceed the minimum fluidisation rate of the solid and must not, on the other hand, exceed the speed for the yield. From a fluidised bed height of approximately 2.5 m to 3 m, fixed equipment is required to prevent the formation of a pulsing fluidised bed and the accompanying pressure pulsations. The fluidised-bed material heated up by the combustion procedure is finally again supplied to the pyrolysis reactor. The fluidised-bed material consists of the ash which remains from the incineration of the solid carbonaceous residue. If an incomplete combustion of the pyrolysis coke within the combustion fluidised bed takes place, the fluidised-bed material which is guided in the circuit as the heat transfer medium consists of the ash of the application material and of unburned carbonaceous pyrolysis residue. As the solid carbonaceous residues of the organic substances and mixtures of organic substances as a rule transform rapidly in the combustion fluidised bed and in part can only have low portions of material which cannot be gasified or incinerated, it is optionally necessary to add additional material in order to form a fluidised bed. Additional material does not need to be added if the application materials have large amounts of material which cannot be gasified or incinerated, which are suitable to build up a fluidised bed. All refractory materials such as sand with a grain diameter of less than 1.5 mm are suitable as the material to be added which serves to form a fluidised bed. The removal of the hot fluidised-bed material and the transport into the pyrolysis reactor is preferably effected by means of one or more overflows which are provided at the reactor wall or project through the reactor wall into the fluidised bed. The method has the advantage that, in addition to the transfer of the hot fluidised-bed material into the pyrolysis reactor, the fluidised bed height of the combustion fluidised bed can be set in a simple manner. The removal of the fluidised-bed material can also be carried out by means of other known conveyors such as a screw conveyor; however in this case the technical method effort is higher.

The invention is based on the basic idea of structuring the method into process stages which are simple to carry out. The individual process stages are their interplay can accordingly be ideally designed while taking into account the special properties of the application material and with respect to the intended product gas quality to be achieved.

Further advantages of the invention are shown by the drawings described in the following in which preferred embodiments of the invention are shown by way of example. The drawing shows

DESCRIPTION OF THE PREFERRED EMBODIMENTS

Figure 1:
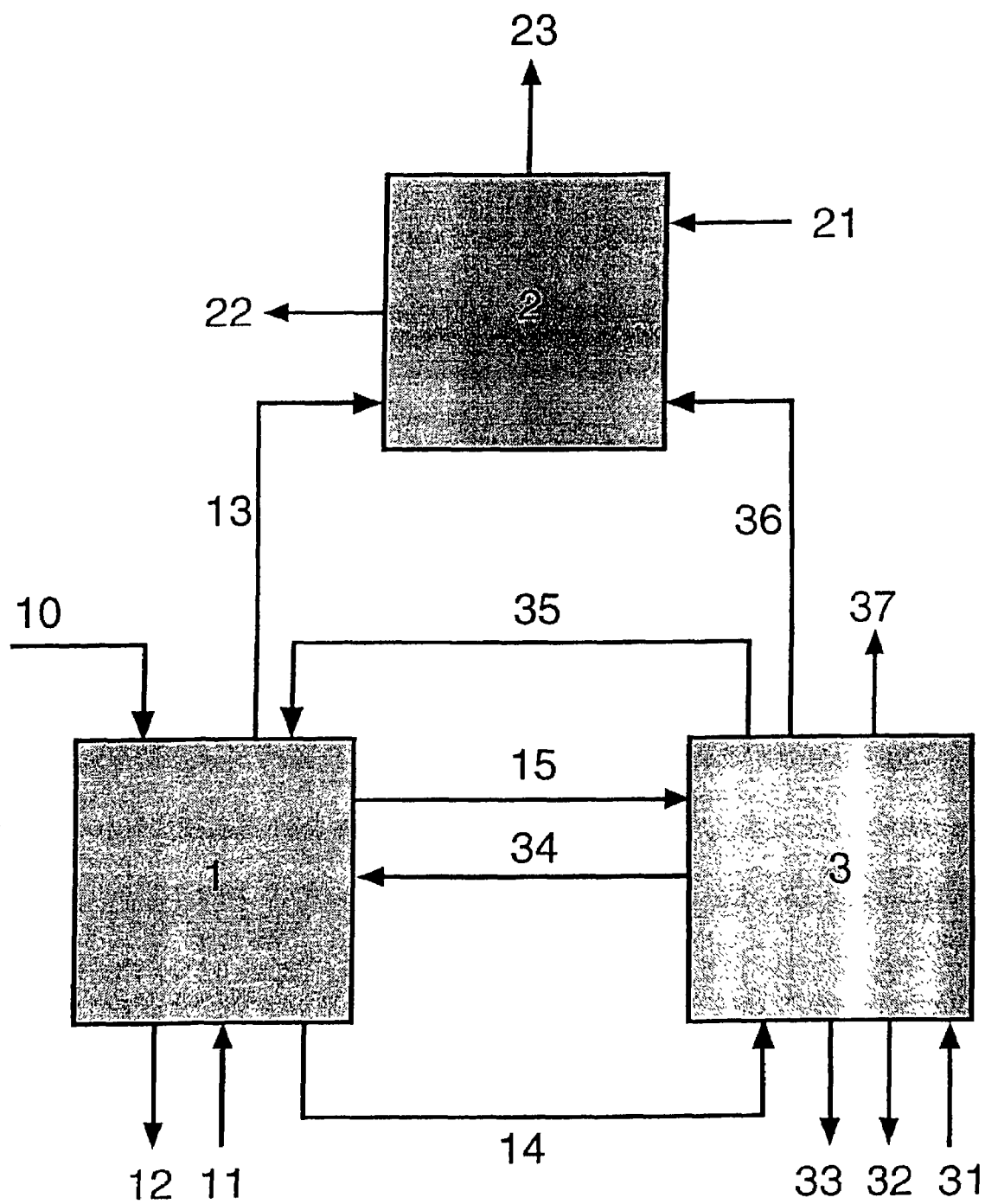
FIG. 1 the mass flows and energy flows of the pyrolysis stage, of the reaction zone and of the combustion fluidised bed of the method in accordance with the invention.

It can be seen from FIG. 1 that the application material 10 and the fluidized-bed material 35 supplied as the heat transfer medium into the pyrolysis stage 1. The heat flow transported with the fluidized fluidised bed material 35 results from the temperature of the combustion fluidized-bed, from the condition and the mass flow of the fluidized-bed material 35 and of the application material flow 10 and from the desired pyrolysis temperature. Furthermore, a gasification agent 11 is supplied and a heat flow 34 transferred from the combustion fluidized bed 3. There exits from the pyrolysis stage 1 pyrolysis gas 13 which is guided into the reaction zone 2, pyrolysis gas 15 which is guided into the combustion reactor (to the combustion fluidized bed 3), a mixture of fluidized bed material and solid carbonaceous pyrolysis residue 14 and a heat loss flow 12.

The mixture of fluidised-bed material and solid carbonaceous pyrolysis residue 14 is guided into the combustion fluidised bed 3 together with pyrolysis gas 15 and air 31. The fluidised-bed material 35 heated up by the incineration is guided back into the pyrolysis reactor 1. The also hot waste gas 37 exits the combustion fluidised bed 3. A portion of the heat 36 contained in the waste gas is transferred to the reaction zone 2. There furthermore exits the combustion reactor 3 a heat loss flow 33 and fluidised-bed material 32 which has to be removed in order to regulate the overall solid household in stationary operation.

The pyrolysis gas 13 supplied to the reaction zone 2 is transformed together with the gasification agent 21 into the product gas 23 with the aid of the supplied heat 36 in the presence of a catalyst. The product gas 23 and heat loss flow 22 finally exit the reaction zone 2.

Embodiment

In the following example, the preferred design of the method of the invention and of the apparatus of the invention is described. The preferred method in accordance with FIG. 2 and the preferred apparatus in accordance with FIG. 3 serves for the pyrolysis and gasification of 900 kg of wood per hour. The wood used as an example substantially consists of 52.3 percent by weight of carbon, 5.9 percent by weight of hydrogen and 41.8 percent by weight of oxygen, in each case with respect to the fuel substance free of water and ash, and furthermore has an ash portion of 0.51 percent by weight with respect to the raw application material. The calorific value of the wood amounts to $H_u=17.2$ MJ/kg with respect to the state free of water; the thermal gasifier power thus amounts to 3.92 MW.

Figure 2:
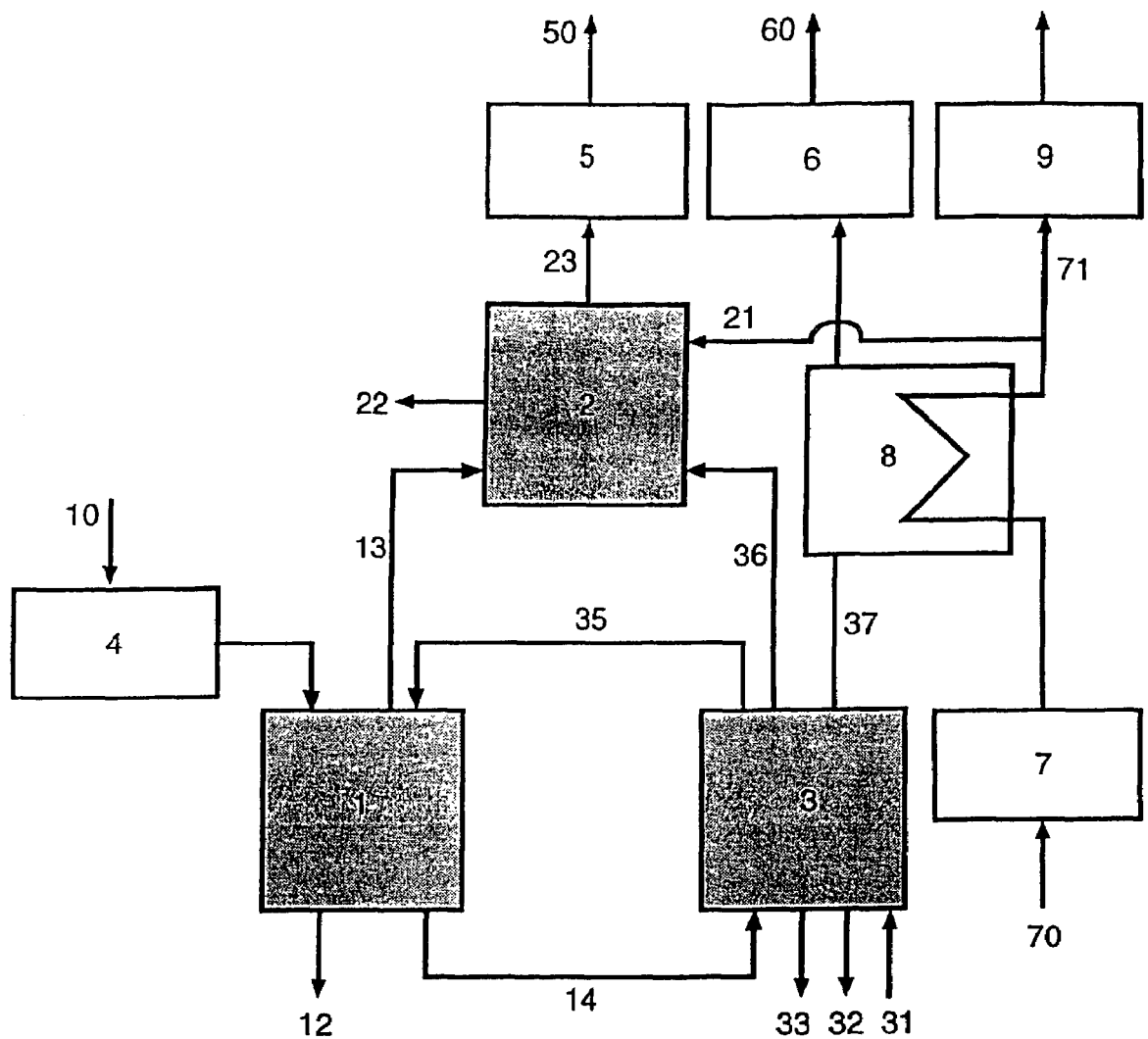
FIG. 2 an embodiment of the method in accordance with the invention in a schematic representation.

In the preferred embodiment described in FIG. 2 of the method for wood gasification, wood 10 is subjected to crushing and/or drying in a preparation stage 4 depending on the condition of the application material before it is passed into the pyrolysis stage 1. The wood has a water content of 8.9 percent by weight after the preparation stage 4.

The pyrolysis is carried out at a temperature of 580° C. The fluidised-bed material 35 introduced into the pyrolysis reactor 1 has a temperature of 900° C. so that the 4.1-fold amount of fluidised-bed material, that is 3.7 t/h, has to be supplied and be in circulation in order to heat up the application material to the pyrolysis temperature of 580° C. On the pyrolysis of the wood, there finally remains 20.3 percent by weight (with respect to the fuel, raw) as the solid pyrolysis residue which has a calorific value of $H_u=30$ MJ/kg. The remaining products from the drying and pyrolysis leave the pyrolysis reactor 1 as the gas 13 and enter into the reaction zone 2. The mixture of solid pyrolysis residue and fluidised-bed material 14 is supplied to the combustion fluidised bed 3 and burned there with air 31. The enthalpy flow supplied to the combustion fluidised bed with the solid pyrolysis residue of the wood amounts to 1.52 MW. In the present example, a power excess coupled to the flue gas flow 37 remains in the combustion fluidised-bed material 3 after removal of the heat loss 33, of the removed fluidised-bed material 32, of the fluidised-bed material 35 and of the energy amount 36 transferred to the reaction zone 2. For this reason, a superheated steam flow is generated with a water flow 70 subjected to treatment 7 while taking into account the firing efficiency in the heat transmission member 8. If the steam flow 21, which is supplied to the reaction zone 2, is taken from the superheated steam flow generated in 8, a superheated steam flow 71 remains with a power of 0.45 MW which is stress relieved via a turbine 9.

Under the supply of the gasification agent of steam 21, the pyrolysis gases 13 are led into the reaction zone 2 consisting of a heat transmission member which is fitted with a catalyst to improve the tar cracking. The energy required for the reaction of the pyrolysis gas 13 with the steam 21 is emitted to the heat transfer element 2 via the hot flue gas flow 36 from the combustion fluidized bed 3, with the reaction taking place at 850° C. to 900° C. depending on the operation management of the combustion fluidized bed 3. Air or oxygen can also be mixed to the gasification agent of stream 21 for a further temperature increase by a partial incineration of the pyrolysis gas. The product gas 23 obtained has a calorific value of 9.87 MJ/M³($V_N$) and is made up of the following gas components: 48.7 percent by volume $H_2$; 36.1 percent by volume CO, 0.1 percent by volume $CH_4$; 6.1 percent by volume $CO_2$; 9 percent by volume $H_2O$. The product gas 23 is subsequently dust separated and quenched in a preparation stage 5. The cold gas efficiency, that is the chemical energy of the application material with respect to the chemical energy content of the product gas, amounts to 80.8%.

Figure 3:
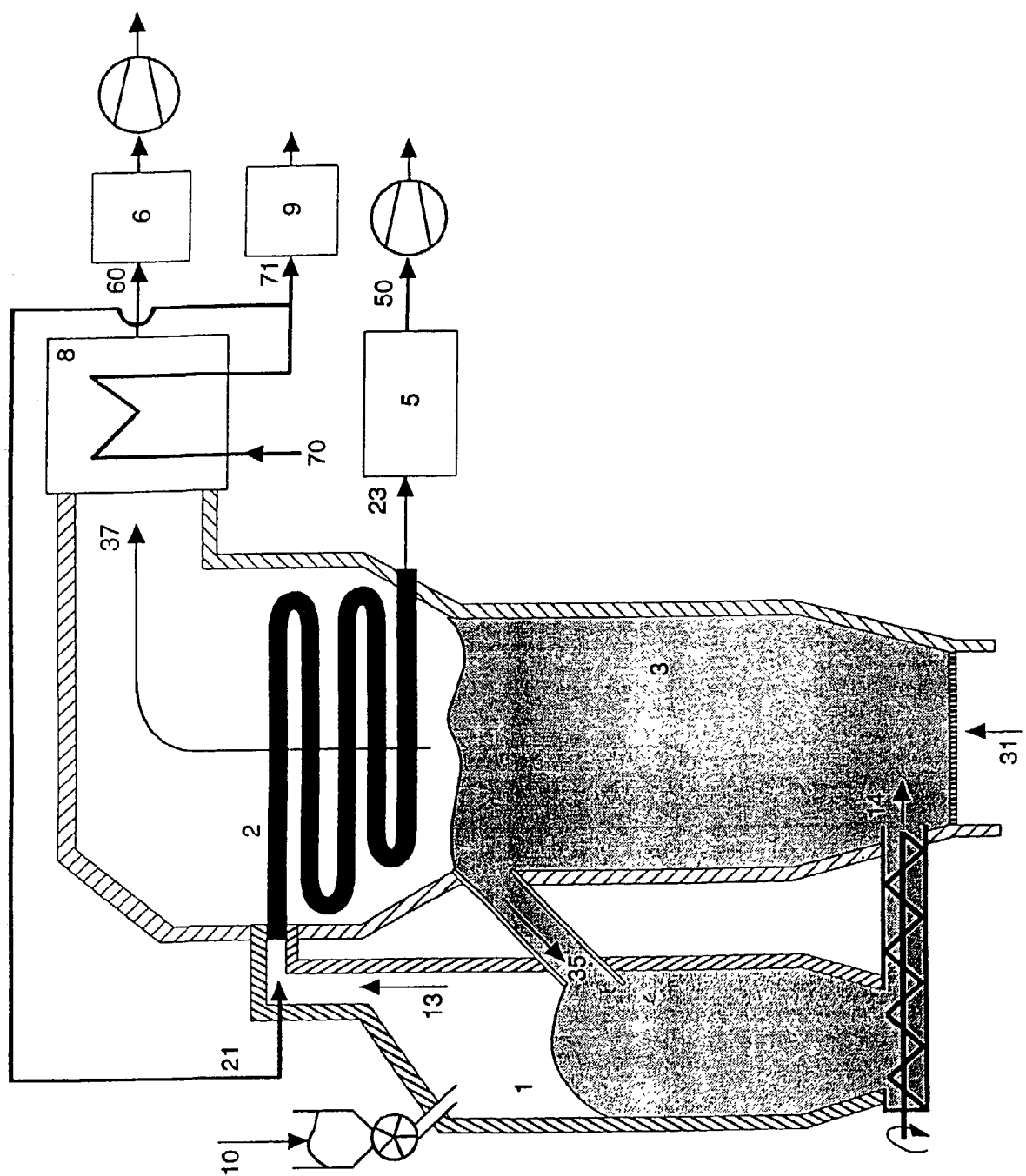
FIG. 3 an embodiment of the apparatus in accordance with the invention in a schematic representation.

FIG. 3 shows a preferred embodiment of the apparatus of the invention for pyrolysis and degasification as an example sketch. The wood 10 is added to the pyrolysis reactor 1 via a gas-impermeable carry-in apparatus, a star wheel in the example case illustrated here. The drying and the pyrolysis of the application material takes place by the contact with the hot fluidised-bed material 35 supplied by an overflow from the combustion fluidised bed 3. The produced pyrolysis gas 13 is led into the reaction zone 2 while adding steam 21, said reaction zone being designed by way of example here as a tube heat transfer member. After transformation of the pyrolysis gas 13 with the steam 21, the product gas 23 is cooled and cleaned in the preparation stage 5. To avoid the unwanted exchange of gases between the pyrolysis reactor 1 and the combustion fluidised bed 3, the fan of the product gas line 50 and the fan of the flue gas line 60 must be matched to one another. Due to the fact that the overflow from the combustion fluidised bed 3 to the pyrolysis reactor 1 is designed such that this is constantly filled with fluidised-bed material 35, then in combination with the said fans, the exchange of gas between both reactors is prevented in a simple manner. A screw is preferably provided to transport the mixture of solid pyrolysis residue and circulating fluidised-bed material 14 into the combustion fluidised bed 3. The screw is to be designed such that the pressure loss through the screw passages filled with material is larger than via the fluidised bed 3 so that the air 31 supplied to the combustion fluidised bed 3 does not flow in the by-pass through the pyrolysis reactor 1. A steam flow 71, which is pressure-relieved for example via a turbine 9, is produced from a water flow with the heat of the flue gas flow 37 via a heat transfer member 8. Part of the steam flow 71 can be used as steam 21 for the reaction zone 2. The waste gas 60 is supplied to a flue gas cleaning 6.

REFERENCE NUMERAL LIST

1 pyrolysis reactor
10 application material
11 gasification agent
12 heat loss
13 pyrolysis gas
14 mixture of solid pyrolysis residue and fluidised-bed material
15 pyrolysis gas
2 reaction zone 21 gasification agent
22 heat loss
23 product gas
3 firing
31 air
32 fluidised-bed material
33 heat loss
34 heat flow
35 fluidised-bed material
36 heat flow
37 combustion waste gas
4 pre-treatment stage
5 gas cleaning
50 cleaned product gas
6 flue gas cleaning
6 waste gas
7 water treatment
70 water
71 steam
8 heat transfer member
9 turbine

The invention claimed is:

1. An apparatus for the carrying out of a method for the pyrolysis and gasification of organic substances or mixtures of organic substances, comprising
   a pyrolysis reactor (1),
   a fluidized-bed firing (3) for the pyrolysis residue,
   a reaction zone (2) for the pyrolysis gases (13),
   a fluidized-bed material (35) circulation between the combustion fluidized-bed (3) and the pyrolysis reactor (1),
   said pyrolysis reactor (1) being a shaft or rotary reactor, comprising a sluice for introducing application material (10) thereinto,
   an inlet for the fluidized bed material (35) into said pyrolysis reactor (1) from the combustion fluidized bed (3), disposed next to the combustion fluidized bed (3);
   the pyrolysis reactor (1) having a transport apparatus (14) arranged for transporting a mixture of solid pyrolysis residue and the circulating fluidized bed material (35) into a bottom or location near the bottom of the combustion fluidized bed (3) and disposed towards the bottom of said fluidized bed (3), from a lower end of said pyrolysis reactor (1) and disposed underneath the lower end of said pyrolysis reactor (1);
   the combustion fluidized bed (3) having an overflow situated at or near a top of said fluidized bed (3) and said pyrolysis reactor (1) and arranged for transferring the circulating fluidized bed material (35) into the pyrolysis reactor (1) and to be constantly filled with the circulating fluidized bed material (35);
   said reaction zone (2) comprising a heat transfer member (2) connected to the pyrolysis reactor (1) for receiving the pyrolysis gases (13) from the pyrolysis reactor (1) and to which waste gases (37) from the combustion fluidized bed (3) are supplied for heat exchange with the pyrolysis gases (13); and
   said overflow positioned immediately underneath said heat transfer member (2) in said reaction zone (2) of said fluidized bed reactor (3) and downwardly sloping to said pyrolysis reactor (1).

2. An apparatus in accordance with claim 1, wherein fluidized-bed material can be removed from the combustion fluidized bed (3) at least at one point or at a plurality of points and can be guided into the pyrolysis sector.

3. An apparatus in accordance with claim 1, wherein fluidized bed material can be removed from the combustion fluidized bed (3) at least at one point or at a plurality of points by means of one or more overflows and can be guided into the pyrolysis reactor.

4. An apparatus in accordance with claim 1, wherein refractory substances can be added to form a fluidized bed.

5. An apparatus in accordance with claim 1, wherein the components of the application material which cannot be burned and which cannot be gasified can be used to form a fluidized bed.

6. An apparatus in accordance with claim 2, wherein fluidized bed material can be removed from the combustion fluidized bed (3) at least at one point or at a plurality of points by means of one or more overflows and can be guided into the pyrolysis reactor.

7. An apparatus in accordance with claim 2, wherein refractory substances can be added to form a fluidized bed.

8. An apparatus in accordance with claim 3, wherein refractory substances can be added to form a fluidized bed.

9. An apparatus in accordance with claim 2, wherein the components of the application material which cannot be burned and which cannot be gasified can be used to form a fluidized bed.

10. An apparatus in accordance with claim 3, wherein the components of the application material which cannot be burned and which cannot be gasified can be used in form of a fluidized bed.

11. A method for the pyrolysis and gasification of organic substances or mixtures of organic substances utilizing an apparatus according to claim 1, wherein
    (1.1) the organic substances are introduced into a drying and pyrolysis reactor (1) in which the organic substances are brought into contact with the fluidized-bed material (35) of the combustion fluidized-bed (3) or in which the organic substances are brought into contact with the fluidized-bed material (35) and the reactor wall of the combustion fluidized-bed (3), whereby a drying and pyrolysis take place, in which the organic substances are transformed into steam from the drying and into pyrolysis products (13), where the pyrolysis product consists of gases with condensable substances and solid carbonaceous residue;
    (1.2) the solid carbonaceous residue or the solid carbonaceous residue and portions of the steam and of the pyrolysis gases with condensable substances and the fluidized-bed material are guided back into the combustion fluidized-bed (3) in which the carbonaceous residue of the organic substances is incinerated, the fluidized-bed material is heated up and is again guided into the pyrolysis reactor (1);
    (1.3) the steam from the drying and the pyrolysis gases (13) are subsequently treated with condensable substance in a further reaction zone (2) such that a product gas (23) with a high calorific value is available;
    (1.4) the drying and pyrolysis are carried out in at least one or more pyrolysis reactors (1);
    (1.5) the drying and pyrolysis are preferably carried out in two or more pyrolysis reactors (1) which consists of two or more moving bed reactors or of two or more rotary reactors or of rotary reactors and moving bed reactors;
    (1.6) the combustion fluidized-bed (3), in which the pyrolysis residues are incinerated, is operated as a stationary fluidized-bed;
    (1.7) no gasification agent or, optionally, a gasification agent such as steam, oxygen or air or a mixture thereof is supplied to the pyrolysis gases (13);
    (1.8) the pyrolysis gases (13) are led into an indirect heat exchanger (2) in which they optionally react with the gasification agent (21);

(1.9) the firing waste gases (37) or the firing waste gases and the fluidized-bed material of the combustion fluidized-bed (3) are brought into contact with the indirect heat exchanger (2) such that their thermal content is used for the reaction of the pyrolysis gases (13) with the gasification agent (21);

(1.10) the fluidized-bed material (3) consists only of the ash of the organic substances, or of the ash and unburned carbonaceous residues of the organic substances, or of the ash of the organic substances and of additional fluidized material, or of the ash and unburned carbonaceous residues of the organic substances and of additional fluidized material.

12. A method in accordance with claim 11, wherein the pyrolysis is carried out at a temperature of 450° C. to 750° C.

13. A method in accordance with claim 11, wherein the product gas (23) is guided back in the pyrolysis reactor (1).

14. A method in accordance with claim 11, wherein gasification agents (21) such as steam, oxygen or air or a mixture thereof are added into the pyrolysis reactor (1).

15. A method in accordance with claim 11, wherein the surface of the reactor wall of the combustion fluidized-bed (3) has any closed geometrical shape on the side of the pyrolysis reactor (1) and the combustion fluidized-bed (3).

16. A method in accordance with claim 11, wherein the reactions of the pyrolysis gases (13) with the gasification agent (21) are carried out at temperatures of 800° C. to 1,050° C.

17. A method in accordance with claim 11, wherein the reactions of the pyrolysis gases (13) with the gasification agent (21) are carried out in the presence of a catalyst.

18. A method in accordance with claim 11, wherein the reactions (13) with the gasification agent (21) are carried out in a solid bed of catalyst material.

19. A method in accordance with claim 11, wherein the reactions of the pyrolysis gases (13) with the gasification agent (21) are carried out in a fluidized-bed of catalyst material.

20. A method in accordance with claim 11, wherein the reactions of the pyrolysis gases (13) with the gasification agent (21) are supplied in the presence of a catalyst added to the pyrolysis gas (13) in the entrained flow.

* * * * *